(12) United States Patent
Fei

(10) Patent No.: US 12,736,802 B2
(45) Date of Patent: Sep. 15, 2026

(54) DUST-STICKING OPTICAL FILTERING MODULE AND SHOOTING DEVICE

(71) Applicant: SHEN ZHEN FUNDER ELECTRONICS LTD, Shenzhen (CN)

(72) Inventor: Fei Fei, Shenzhen (CN)

(73) Assignee: SHEN ZHEN FUNDER ELECTRONICS LTD, Shenzhen (CN)

( * ) Notice: Subject to any disclaimer, the term of this patent is extended or adjusted under 35 U.S.C. 154(b) by 271 days.

(21) Appl. No.: 18/587,057

(22) Filed: Feb. 26, 2024

(65) Prior Publication Data

US 2025/0020914 A1 Jan. 16, 2025

(30) Foreign Application Priority Data

Jul. 12, 2023 (CN) ......................... 202321827095.5
Jul. 12, 2023 (CN) ......................... 202321831085.9

(51) Int. Cl.
*G02B 27/00* (2006.01)
*H04N 23/52* (2023.01)
*H04N 23/55* (2023.01)

(52) U.S. Cl.
CPC ......... *G02B 27/0006* (2013.01); *H04N 23/52* (2023.01); *H04N 23/55* (2023.01)

(58) Field of Classification Search
None
See application file for complete search history.

(56) References Cited

U.S. PATENT DOCUMENTS

2008/0297899 A1* 12/2008 Osaka ................ G02B 27/0006 359/507
2018/0059432 A1* 3/2018 Gong ................... G02B 27/646
2020/0218015 A1* 7/2020 Ho ........................ G02B 6/3825
2021/0109421 A1* 4/2021 Yu .......................... G03B 30/00
2022/0006929 A1* 1/2022 Li .......................... H04N 23/57

* cited by examiner

*Primary Examiner* — Ryan Crockett
(74) *Attorney, Agent, or Firm* — Westbridge IP LLC

(57) ABSTRACT

Disclosed are a dust-sticking optical filtering module and a shooting device. The dust-sticking optical filtering module includes: a base, a light filtering assembly and a dust-sticking plate; a light-transmitting space is formed inside the base, and the base is provided with a first light-transmitting hole communicated with the light-transmitting space; the light filtering assembly is slidably provided in the light-transmitting space, and the light filtering assembly is provided with a light filtering hole corresponding to the first light-transmitting hole; and the dust-sticking plate is connected to a bottom of the base to stick dust accumulated in the light-transmitting space, the dust-sticking plate is provided with a second light-transmitting hole communicated with the light-transmitting space.

12 Claims, 8 Drawing Sheets

DUST-STICKING OPTICAL FILTERING MODULE AND SHOOTING DEVICE

CROSS-REFERENCE TO RELATED APPLICATIONS

The present application claims priority to Chinese Patent Application No. 202321831085.9, filed on Jul. 12, 2023, and Chinese Patent Application No. 202321827095.5, filed on Jul. 12, 2023, the entire contents of which are incorporated herein by reference.

TECHNICAL FIELD

The present application relates to the technical field of shooting devices, and in particular to a dust-sticking optical filtering module and a shooting device.

BACKGROUND

With the development of technology, many electronic devices, such as computers, laptops, tablets, mobile phones and other electronic devices, are equipped with shooting devices. These cameras have open camera lenses and can always see the captured scenery.

However, the light filtering piece on the camera in the related art is installed directly inside the base. The light filtering piece is a commonly used part of the camera, which can change the light entrance aperture of the camera, that is, control the size of the incident light according to needs. However, once dusted during the dimming process, the light filtering piece will produce stains, resulting in poor imaging quality of the camera, so that the overall use is very inconvenient. At the same time, the stability of the device is also very poor, which is hard to meet people's needs.

SUMMARY

The main purpose of the present application is to provide a dust-sticking optical filtering module, aiming to solve the problem that the base in the related art cannot stick the dust.

In order to achieve the above purpose, the dust-sticking optical filtering module provided in the present application includes: a base, a light filtering assembly and a dust-sticking plate; a light-transmitting space is formed inside the base, and the base is provided with a first light-transmitting hole communicated with the light-transmitting space; the light filtering assembly is slidably provided in the light-transmitting space, the light filtering assembly is provided with a light filtering hole corresponding to the first light-transmitting hole; and the dust-sticking plate is connected to a bottom of the base to stick dust accumulated in the light-transmitting space, and the dust-sticking plate is provided with a second light-transmitting hole communicated with the light-transmitting space.

In an embodiment, an outer surface of the dust-sticking plate towards the light-transmitting space is coated with a dust-sticking film.

In an embodiment, the dust-sticking optical filtering module further includes a positioning assembly configured for connecting the base and the dust-sticking plate to fix the base and the dust-sticking plate.

In an embodiment, the positioning assembly includes a first positioning hole provided on the base and a second positioning hole provided on the dust-sticking plate, and the first positioning hole is fixed with the second positioning hole through a fastener.

In an embodiment, the dust-sticking optical filtering module further includes a limiting assembly configured for connecting the base and the dust-sticking plate to limit a relative position of the base and the dust-sticking plate.

In an embodiment, the limiting assembly includes a limiting protrusion provided at the base and a limiting hole provided at the dust-sticking plate, and the limiting protrusion is cooperated with the limiting hole to assist the positioning assembly in fixing the base and the dust-sticking plate.

In an embodiment, the dust-sticking optical filtering module further includes: a thermally conductive plate embedded in an opening, the thermally conductive plate is provided with a third light-transmitting hole communicated with the light-transmitting space, and a material of the thermally conductive plate is thermally conductive silica gel.

In an embodiment, the thermally conductive plate is snapped at the opening.

In an embodiment, an outer surface of the thermally conductive plate towards the light-transmitting space is coated with a dust-sticking film.

In an embodiment, the light filtering assembly includes an upper base plate, a lower base plate and a light filtering piece, the upper base plate and the lower base plate are enclosed to form an accommodating chamber, the light filtering piece is provided in the accommodating chamber, and the light filtering hole is provided on the upper base plate, the lower base plate and the light filtering piece.

In an embodiment, the upper base plate is snapped with the lower base plate.

In an embodiment, the upper base plate is provided with a first end and a second end opposite to the first end, the second end of the upper base plate is provided with the light filtering hole, and the second end of the upper base plate is slidingly connected to the light-transmitting space.

In an embodiment, the base is provided with a sliding port communicated with the light-transmitting space, there are two sliding ports opposite to each other, and two ends of the light filtering assembly are respectively lapped on the two sliding ports so that the light filtering assembly is configured to slide in the light-transmitting space.

In an embodiment, the base is further provided with an installation cavity, and the installation cavity is provided on one side of the base away from the dust-sticking plate and is communicated with the first light-transmitting hole to install a camera lens.

The present application also provides a shooting device, including a camera lens and the dust-sticking optical filtering module, and the base is configured to carry the camera lens.

Compared with the related art, in the technical solution provided by the present application, when disassembling or assembling the camera lens and sliding the light filtering assembly during the process of taking pictures, the dust will enter the light-transmitting space, and the filtering performance of the light filtering assembly will be affected. In the present application, the dust-sticking plate is provided in the dust-sticking optical filtering module. The dust-sticking plate is provided at the bottom of the base, which can effectively stick the floating or accumulated dust to the surface of the dust-sticking plate in the light-transmitting space. In this way, the problem of the dust stick to the light filtering piece of the light filtering assembly in the light-transmitting space affecting the light filtering effect is avoided, thus improving the imaging quality.

BRIEF DESCRIPTION OF THE DRAWINGS

In order to illustrate the technical solutions in the embodiments of the present application or in the related art more clearly, the following briefly introduces the accompanying drawings required for the description of the embodiments or the related art. Obviously, the drawings in the following description are only part of embodiments of the present application. For those skilled in the art, other drawings can also be obtained according to the structures shown in these drawings without any creative effort.

Figure 1:
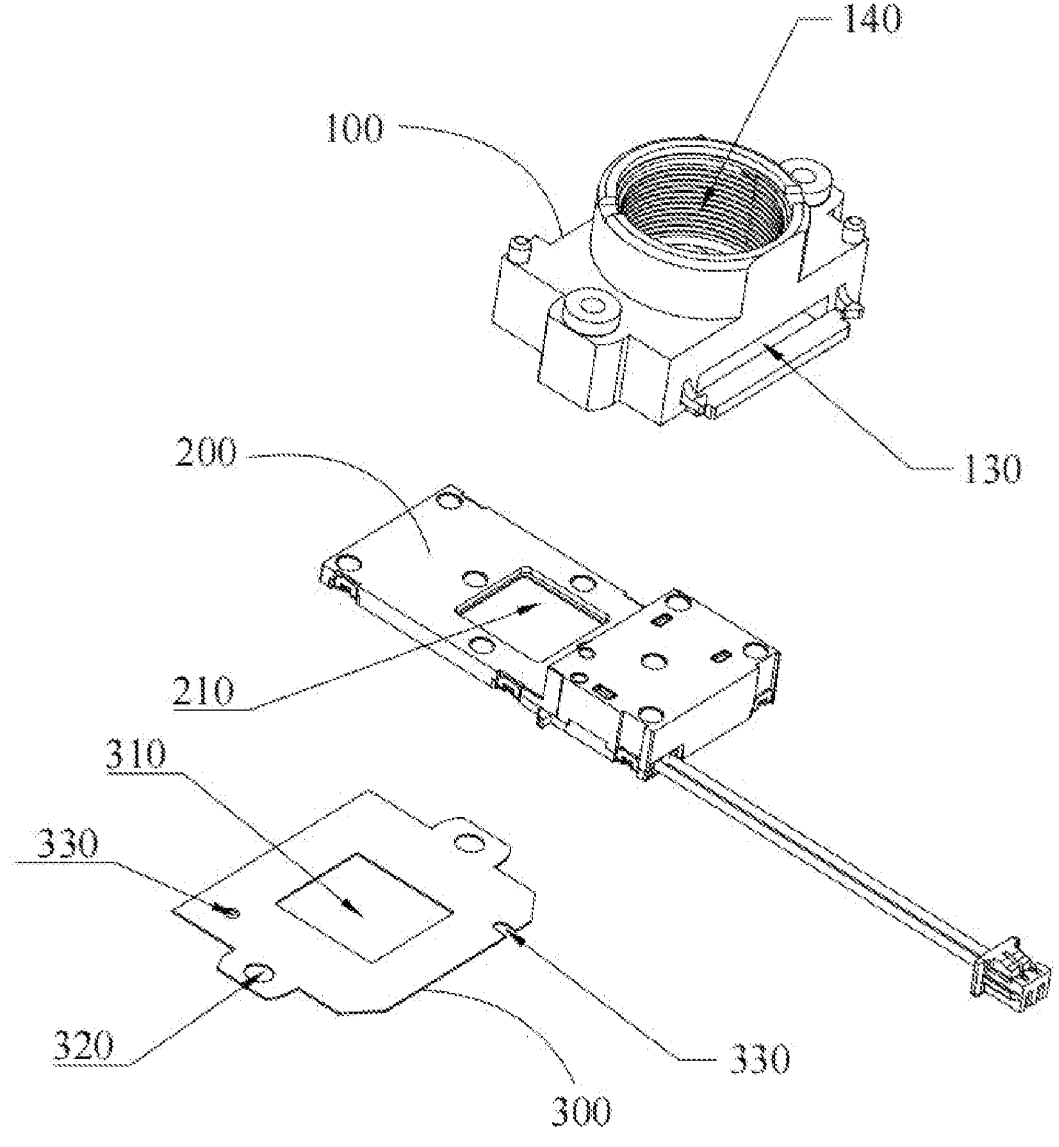
FIG. 1 is a schematic exploded structural view of a dust-sticking optical filtering module according to an embodiment of the present application.

The realization of the objective, functional characteristics, and advantages of the present application are further described with reference to the accompanying drawings.

DETAILED DESCRIPTION OF THE EMBODIMENTS

It should be noted that all directional indications (such as up, down, left, right, front, back, etc.) in the embodiments of the present application are only used to explain the relative positional relationship, the movement situation, etc. among various assemblies under a certain posture as shown in the drawings. If the specific posture changes, the directional indication also changes accordingly.

In the present application, unless otherwise explicitly stipulated and limited, the terms "connection" and "connected" should be understood in a broad sense. For example, it can be a fixed connection, a detachable connection or an integrated connection, a mechanical connection or an electrical connection, a direct connection or an indirect connection through an intermediate medium, a connection within two components or an interaction between two components, unless explicitly specified otherwise. For those skilled in the art, the specific meanings of the above terms in the embodiments of the present application can be understood in specific situations.

In addition, if there are descriptions related to "first", "second", etc. in the embodiments of the present application, the descriptions of "first", "second", etc. are only for the purpose of description, and should not be construed as indicating or implying relative importance or implicitly indicates the number of technical features indicated. Thus, a feature delimited with "first", "second" may expressly or implicitly include at least one of that feature. Besides, the meaning of "and/or" appearing in the application includes three parallel scenarios. For example, "A and/or B" includes only A, or only B, or both A and B. In addition, the technical solutions between the various embodiments can be combined with each other, but must be based on the realization by those skilled in the art. When the combination of technical solutions is contradictory or cannot be realized, it should be considered that the combination of such technical solutions does not exist or fall within the scope of protection claimed in the present application.

The light filtering piece on the camera in the related art is installed directly inside the base. The light filtering piece is a commonly used part of the camera, which can change the light entrance aperture of the camera, that is, control the size of the incident light according to needs. However, once dusted during the dimming process, the light filtering piece will produce stains, resulting in poor imaging quality of the camera, so that the overall use is very inconvenient. At the same time, the stability of the device is also very poor, which is hard to meet people's needs.

Based on this, the present application provides a dust-sticking optical filtering module. A dust-sticking plate is provided at a bottom of the base, which can effectively stick the floating or accumulated dust in the light-transmitting space, thereby ensuring a light filtering effect of the light filtering assembly and improving the imaging quality.

In order to better understand the above technical solution, the above technical solution will be described in detail below with reference to the accompanying drawings.

As shown in FIG. 1 to FIG. 4, the dust-sticking optical filtering module includes: a base 100, a light filtering assembly 200 and a dust-sticking plate 300.

A light-transmitting space 110 is formed inside the base 100, and a first light-transmitting hole 120 communicated with the light-transmitting space 110 is provided on the base 100; the light filtering assembly 200 is slidably provided in the light-transmitting space 110, and the light filtering assembly 200 is provided with a light filtering hole 210 corresponding to the first light-transmitting hole 120; and the dust-sticking plate 300 is connected to a bottom of the base 100 to stick the dust accumulated in the light-transmitting space 110, and the dust-sticking plate 300 is provided with a second light-transmitting hole 310 communicated with the light-transmitting space 110.

In the technical solution provided by the present application, when disassembling or assembling the camera lens and sliding the light filtering assembly 200 during the process of taking pictures, the dust will enter the light-transmitting space 110, and the filtering performance of the light filtering assembly 200 will be affected. In the present application, the dust-sticking plate 300 is provided in the dust-sticking optical filtering module. The dust-sticking plate 300 is provided at the bottom of the base 100, which can effectively stick the floating or accumulated dust to the surface of the dust-sticking plate 300 in the light-transmitting space 110. In this way, the problem of the dust stick to the light filtering piece of the light filtering assembly 200 in the light-transmitting space 110 affecting the light filtering effect is avoided, thus improving the imaging quality.

Specifically, in this embodiment, the shape of the base 100 is not specifically limited, as long as the light-transmitting space 110 with the camera lens can be formed inside. For example, it can be circular or square. Similarly, there is no specific limit on the material of the base 100. For example, it can be metal or plastic. It should be pointed out that the specific connection method between the light filtering assembly 200 and the base 100 is not specifically limited, as long as the light reaching the light filtering hole 210 through the first light-transmitting hole 120 can be changed through sliding the light filtering assembly 200. In addition, the shape of the dust-sticking plate 300 is not specifically limited. For example, it can be square or circular, as long as to match the shape of the bottom of the base 100. Similarly, there is no specific limit on the material of the dust-sticking plate 300, as long as it has a strong sticking effect on dust particles. The dust-sticking plate 300 can be completely made of the dust-sticking material, or at least one layer of the dust-sticking film is coated on the surface of the dust-sticking plate 300. The dust-sticking material can be chemical fiber material, polyethylene terephthalate (PET) material or polyester fiber, etc., as long as it has an excellent sticking effect on the dust.

In an embodiment, in order to take into account dual functions including a certain strength and sticking dust of the dust-sticking plate 300, a substrate of the dust-sticking plate 300 can be made of a material with a certain strength such as plastic or steel plate, and only an outer surface of the dust-sticking plate 300 towards the light-transmitting space 110 is coated with the dust-sticking film, and the dust-sticking film can be polyethylene terephthalate. The thickness of the film is not specifically limited and can be selected according to actual needs. It should be pointed out that in order to improve the dust stick effect of the dust-sticking plate 300, some components that easily generate static electricity can be added to the polyethylene terephthalate film, such as polyester. Of course, in an embodiment, an entire peripheral surface of the dust-sticking plate 300 can be coated with the dust-sticking film.

Figure 3:
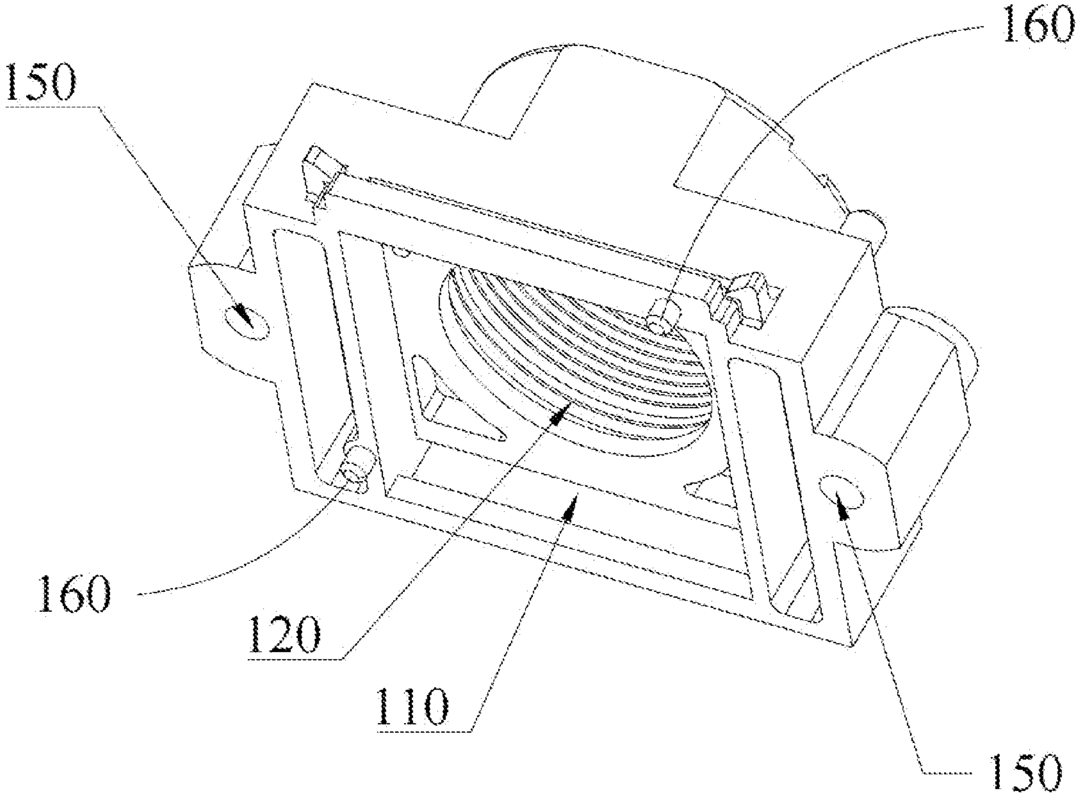
FIG. 3 is a schematic structural view of a base in the dust-sticking optical filtering module according to an embodiment of the present application.

In an embodiment, in order to improve the fixing strength of the base 100 and the dust-sticking plate 300, the dust-sticking optical filtering module can also include a positioning assembly. By connecting the base 100 and the dust-sticking plate 300 through the positioning assembly, the base 100 and the dust-sticking plate 300 can be effectively fixed. As shown in FIG. 1 and FIG. 3, in an embodiment, the positioning assembly may include a first positioning hole 150 provided at the base 100 and a second positioning hole 320 provided at the dust-sticking plate 300. It can be understood that, in order to facilitate fixation, the first positioning hole 150 has a same shape and a same external diameter as the second positioning hole 320. Further, an internal thread can be provided inside the first positioning hole 150, so that the first positioning hole 150 and the second positioning hole 320 are fixed through a fastener, such as a bolt or a screw.

In an embodiment, in order to improve the fixing efficiency of the base 100 and the dust-sticking plate 300, the dust-sticking optical filtering module can also include a limiting assembly. Through the limiting assembly, pre-fixing can be performed before fixing, that is, a relative position of the base 100 and the dust-sticking plate 300 is roughly fixed before the fixation, which can effectively improve the fixing efficiency of the base 100 and the dust-sticking plate 300. As shown in FIGS. 1 and 3, in an embodiment, the limiting assembly may include a limiting protrusion 160 provided at the base 100 and a limiting hole 330 provided at the dust-sticking plate 300. The shape of the limiting protrusion 160 and the limiting hole 330 is not specifically limited. For example, the limiting protrusion 160 can be a convex column, the limiting hole 330 can be a circular closed hole, or a hole groove with an opening, etc. The limiting protrusion 160 is cooperated with the limiting hole 330 to assist the positioning assembly in fixing the base 100 and the dust-sticking plate 300. That is, before the first positioning hole 150 and the second positioning hole 320 are fixed, the limiting protrusion 160 can be inserted into the limiting hole 330 to roughly fix, thereby improving the assembly efficiency of the dust-sticking plate 300 and the base 100.

The plastic camera lens and the base in the related art have poor thermal conductivity, and high temperatures can easily cause the complementary metal-oxide-semiconductor (CMOS) sensor to overheat, affecting the image quality. At the same time, overheating inside the camera and low external ambient temperature will cause the lens on the camera lens to produce a natural physical phenomenon of fogging, which will affect the imaging effect. High temperatures will also cause the focal length of the camera lens to change and become out of focus.

Based on this, in an embodiment of the present application, a thermally conductive plate is provided in the light-transmitting space of the base to timely output the heat inside the base, thereby reducing the temperature difference between the inside and outside of the dust-sticking optical filtering module, and improving the focusing efficiency and imaging effects.

As shown in FIG. 5 to FIG. 8, the dust-sticking optical filtering module also includes: a thermally conductive plate 500, which is embedded in the opening. The thermally conductive plate 500 is provided with a third light-transmitting hole communicated with the light-transmitting space 110, and the material of the thermally conductive plate 500 is thermally conductive silica gel.

In the technical solution of this embodiment, the thermally conductive plate 500 is embedded at the opening of the light-transmitting space 110, the thermally conductive plate 500 is abutted against a housing on all sides of the light-transmitting space 110 on the base 100, which can timely output the heat in the light-transmitting space 110 through the base 100, so that the temperature difference between the inside and outside of the base 100 is small. On the one hand, it can avoid the phenomenon of fogging generated by the lens on the camera when the camera lens is installed on the base 100, thereby improving focusing efficiency and imaging quality. On the other hand, it can also reduce the temperature inside the base 100, avoid damage to the components in the camera lens, and increase the service life of the camera lens. In the present application, the thermally conductive plate 500 is made of thermally conductive silica gel. The high thermal conductivity of thermally conductive silica gel can be used to timely conduct the heat inside the base 100 to the outside surrounding air, which can reduce the temperature difference between the inside and outside of the dust-sticking optical filtering module, and improve focusing efficiency and imaging effects. In addition, thermally conductive silica gel also has excellent cohesiveness and can stick dust floating or accumulated in the light-transmitting space 110 to the surface of the thermally conductive plate 500. Therefore, the camera module has excellent thermal conductivity and dust adhesion.

Specifically, in this embodiment, the shape of the base 100 is not specifically limited, as long as the light-transmitting space 110 for the camera lens to transmit light is formed inside, for example, it can be circular or square. Similarly, there is no specific limit on the material of the base 100. For example, it can be metal or plastic. It should be pointed out that the specific connection method between the light filtering assembly 200 and the base 100 is not specifically limited, as long as the light reaching the light filtering hole 210 through the first light-transmitting hole 120 can be changed through sliding the light filtering assembly 200. In addition, the shape of the thermally conductive plate 500 is not specifically limited. For example, it can be square or circular, as long as to match the opening of the light-transmitting space 110. It should be noted that, the material of the thermally conductive plate 500 is thermally conductive silica gel. Since the thermally conductive silica gel has high thermal conductivity, it can effectively conduct heat in the light-transmitting space 110. It should be pointed out that since the thermally conductive silica gel also has high cohesiveness, the dust stick floating or accumulated in the light-transmitting space 110 is stuck on the surface of the thermally conductive plate 500. In this way, the problem of the dust stick to the light filtering piece 440 of the light filtering assembly 200 in the light-transmitting space 110 affecting the light filtering effect is avoided, thus improving the imaging quality. In this way, the heat in the light-transmitting space 110 can be timely conducted to the base 100 through the thermally conductive plate 500, and the heat can be dissipated to the surrounding air through the base 100 to prevent the camera lens from being overheated during long-term use, which otherwise may affect the service life of internal components.

Figure 6:
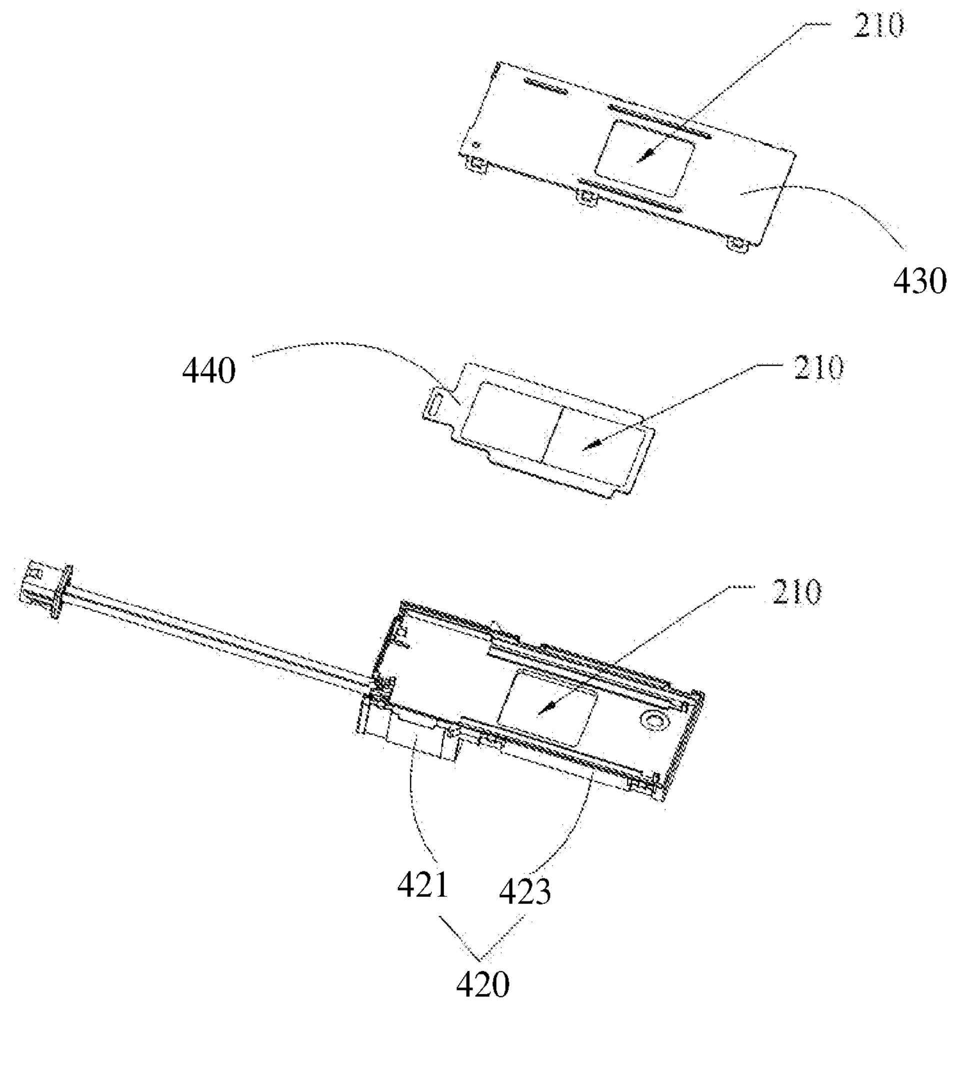
FIG. 6 is a schematic structural view of the dust-sticking optical filtering module in another combined state according to an embodiment of the present application.
Figure 7:
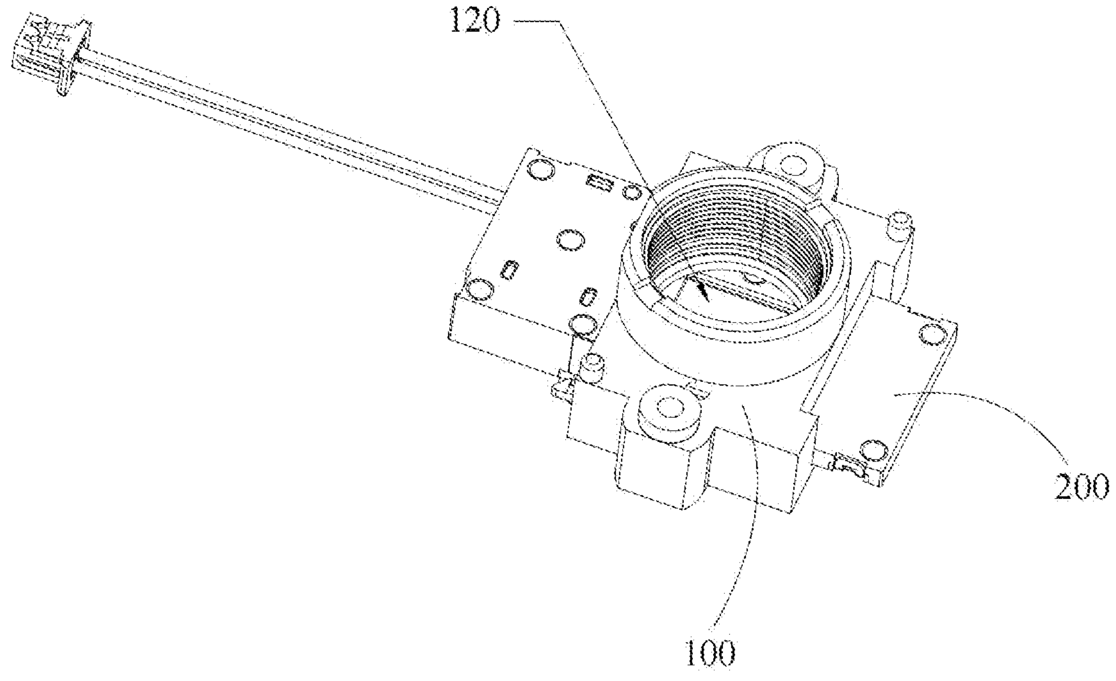
FIG. 7 is a schematic structural view of the dust-sticking optical filtering module in the other combined state from another angle according to an embodiment of the present application.

As shown in FIG. 6, in an embodiment of the present application, in order to facilitate the fixation of the thermally conductive plate 500, the thermally conductive plate 500 can be snapped at the opening, which can facilitate the removal and placement of the thermally conductive plate 500. For example, the thermally conductive silica gel can be abutted against the opening through the elasticity, or a recess can be provided around the opening to fix the thermally conductive plate 500.

In an embodiment, in order to improve the dust collection effect of the thermally conductive plate 500, the substrate of the thermally conductive plate 500 is made of thermally conductive silica gel, and the outer surface of the thermally conductive plate 500 facing the light-transmitting space 110 can also be coated with the dust-sticking film. The material of the dust-sticking film can be thermally conductive silicone film or polyethylene terephthalate film. There is no specific limit on the thickness of the film and can be selected according to actual needs. It should be pointed out that in order to improve the dust collection effect of the thermally conductive plate 500, some components that easily generate static electricity can be added to the dust-sticking film, such as polyester. Of course, in an embodiment, the entire peripheral surface of the thermally conductive plate 500 can be coated with the dust-sticking film.

Figure 8:
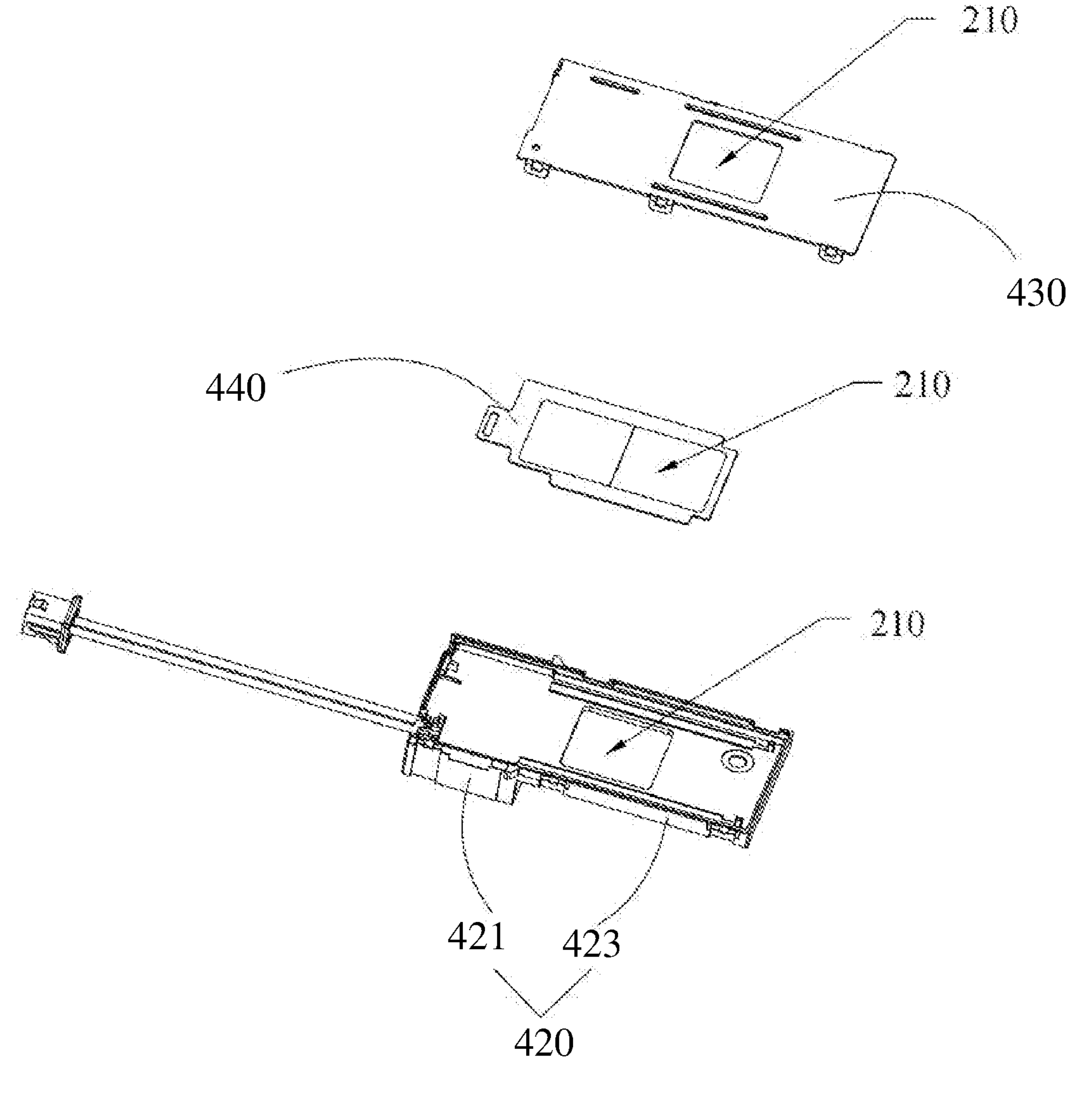
FIG. 8 is a schematic structural view of a light filtering assembly in the dust-sticking optical filtering module according to an embodiment of the present application.

As shown in FIG. 8, in an embodiment of the present application, in order to facilitate the control of the sliding of the light filtering piece 440, the light filtering assembly 200 includes an upper base plate 420, a lower base plate 430 and a light filtering piece 440. The upper base plate 420 and the lower base plate 430 are enclosed to form an accommodating chamber. The light filtering piece 440 is provided in the accommodating chamber, which can protect the light filtering piece 440 from wear due to sliding back and forth. It can be understood that light filtering holes 210 need to be provided on the upper base plate 420, the lower base plate 430 and the light filtering piece 440, and the light filtering holes 210 need to be correspondingly provided.

Figure 5:
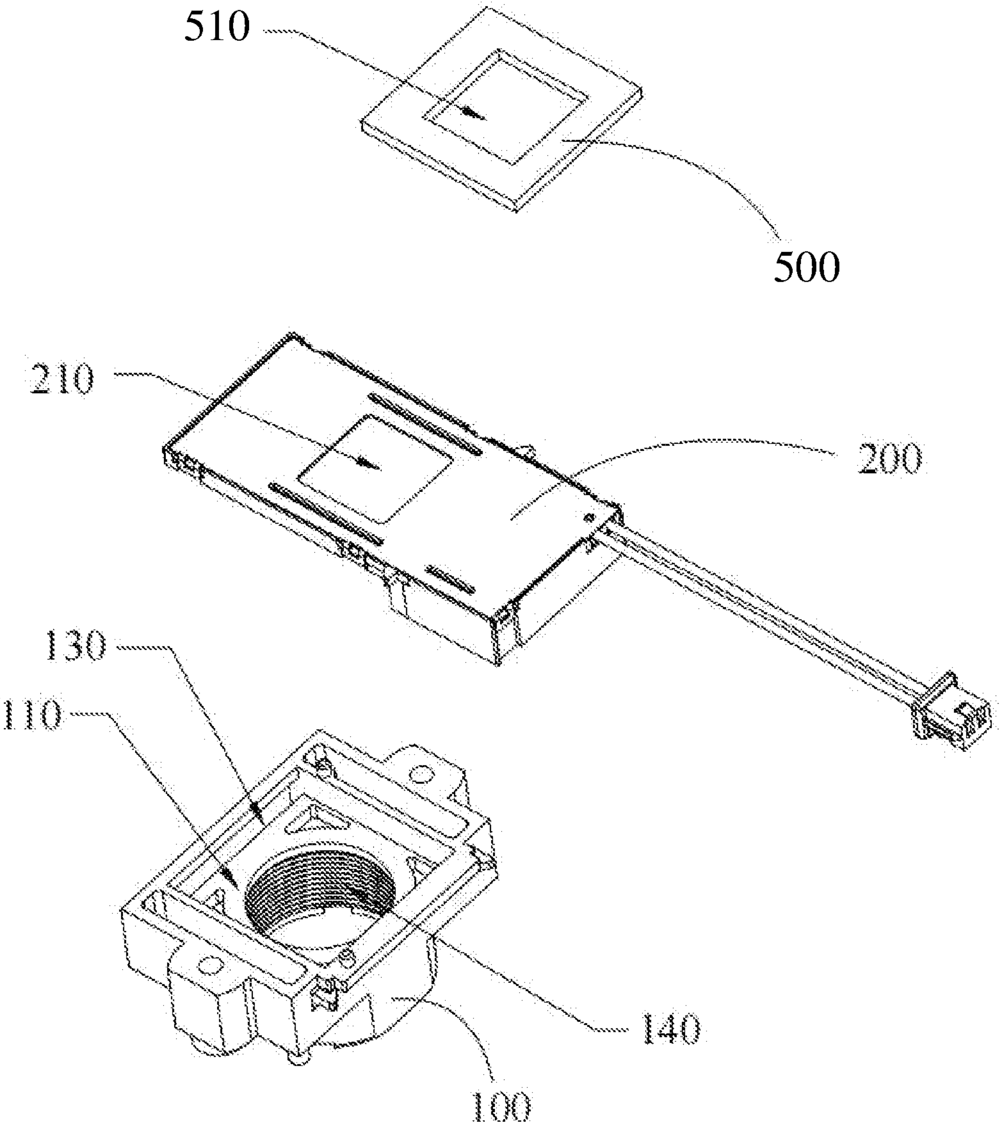
FIG. 5 is a schematic exploded structural view of the dust-sticking optical filtering module according to an embodiment of the present application.

As shown in FIG. 5, in an embodiment of the present application, in order to facilitate the replacement of the light filtering piece 440, the upper base plate 420 is snapped with the lower base plate 430. For example, a buckle can be provided on the side surface of the lower base plate 430, a clamping slot matched with the buckle can be provided on the outer side surface of the upper base plate 420, and an elastic convex block can be installed in the clamping slot. When the plate 420 and the lower base plate 430 are enclosed, the elastic convex block is squeezed to generate elastic force and automatically springs to the buckle on the lower base plate 430, so that the upper base plate 420 is snapped with the lower base plate 430. Of course, a buckle can also be provided on the side surface of the upper base plate 420, and a clamping slot matched with the buckle is provided on the outer side surface of the lower base plate 430, as long as the upper base plate 420 can be snapped and fixed with the lower base plate 430.

As shown in FIG. 8, in an embodiment of the present application, in order to reduce the overall space of the dust-sticking optical filtering module so that the light filtering assembly 200 can better cooperate with the dust-sticking optical filtering module, the upper base plate 420 is provided with a first end 421 and a second end 423 opposite to the first end 421. The second end 423 of the upper base plate 420 is provided with a light filtering hole 210, and the second end 423 of the upper base plate 420 is slidingly connected to the light-transmitting space 110. It should be noted that the thickness of the second end 423 should be relatively thin to ensure that it can slide smoothly in the light-transmitting space 110.

Figure 4:
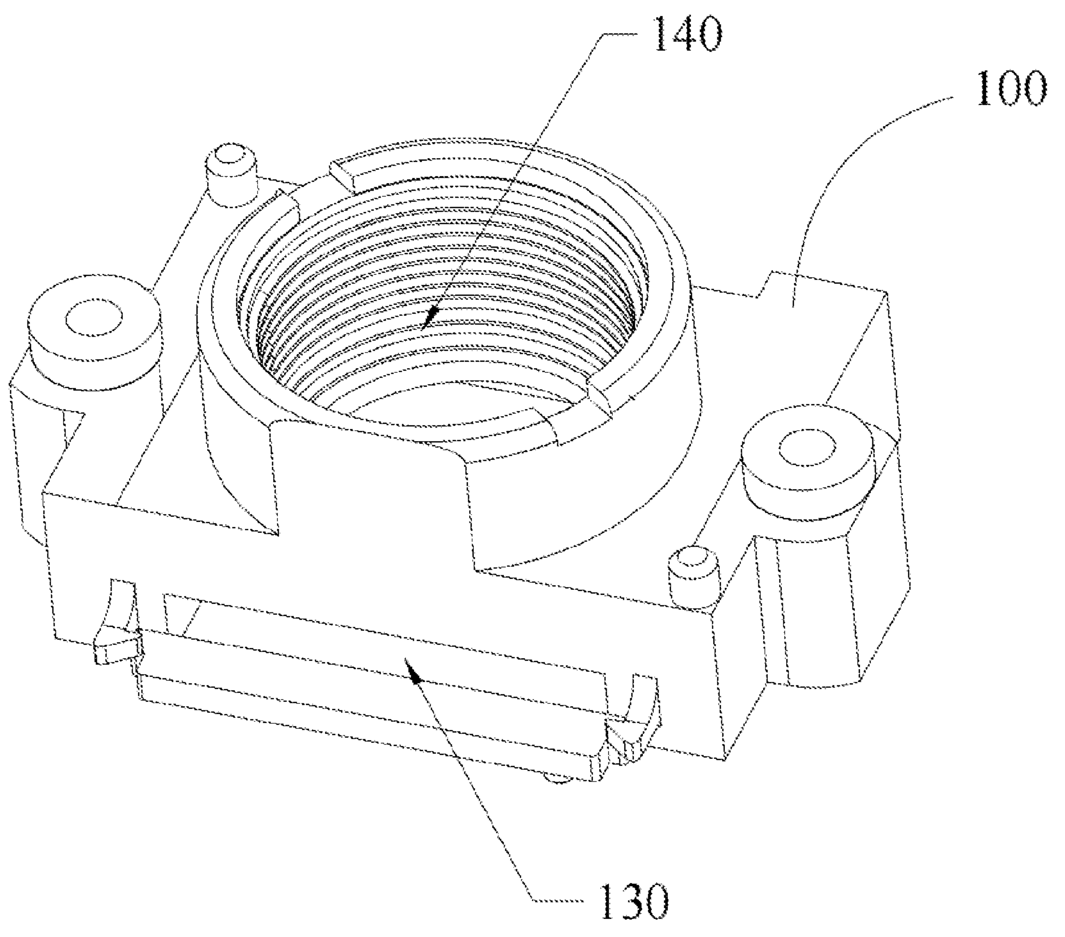
FIG. 4 is a schematic structural view of the base in the dust-sticking optical filtering module from another angle according to an embodiment of the present application.

As shown in FIGS. 3 and 4, in an embodiment of the present application, in order to facilitate the sliding of the light filtering assembly 200 in the light-transmitting space 110, the base 100 can be provided with a sliding port 130 communicated with the light-transmitting space 110. There are two sliding ports 130 facing each other. The two sliding ports 130 are respectively provided on the two opposite side surfaces of the base 100. In this way, the two ends of the light filtering assembly 200 can be lapped on the two sliding ports 130, and the light filtering assembly 200 can smoothly slide in the light-transmitting space 110. It can be understood that the diameter of the sliding port 130 is slightly larger than the external diameter of the light filtering assembly 200. In an embodiment, as shown in FIG. 5, the two ends of the second end 423 of the upper base plate 420 can be lapped on the two sliding ports 130 respectively, so that the light filtering assembly 200 can smoothly slide in the light-transmitting space 110. It can be understood that the diameter of the sliding port 130 is slightly larger than the external diameter of the second end 423 of the upper base plate 420.

Figure 2:
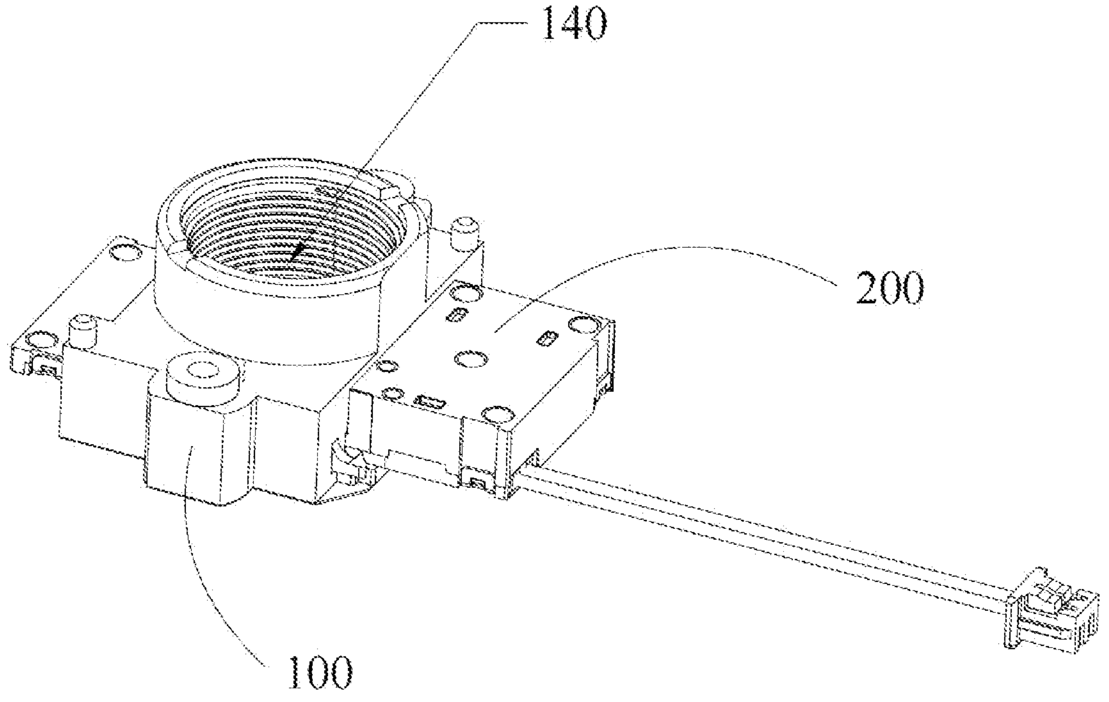
FIG. 2 is a schematic structural view of the dust-sticking optical filtering module in a combined state according to an embodiment of the present application.

As shown in FIG. 1 and FIG. 2, in an embodiment of the present application, in order to facilitate the installation of the camera lens, an installation cavity 140 can also be provided on the base 100. The installation cavity 140 is provided at one side of the base 100 away from the dust-sticking plate 300. An internal thread can be provided inside the installation cavity 140. The camera lens can be fixed to the base 100 through the threaded connection between the external thread on the camera lens and the internal thread of the installation cavity 140. It should be noted that the installation cavity 140 is communicated with the first light-transmitting hole 120 to ensure that the light captured by the viewing hole in the camera lens can reach the first light-transmitting hole 120 and then be transmitted to the light filtering assembly 200.

In order to achieve the above object, the present application also provides a shooting device, including the camera lens and the dust-sticking optical filtering module described in any of the above embodiments. Specifically, the base is used to install the camera lens. The specific structure of the dust-sticking optical filtering module refers to the above-mentioned embodiment. Since the shooting device adopts all the technical solutions of the above-mentioned embodiments, it has at least all the beneficial effects brought by the technical solutions of the above-mentioned embodiments, and will not be repeated here. In this embodiment, the shooting device can be a camera, a mobile phone, a laptop, a video monitor, etc., and is not specifically limited here.

The above descriptions are only embodiments of the present application, and are not intended to limit the scope of the present application. Under the inventive concept of the present application, any equivalent structural transformations made by using the contents of the description and drawings of the present application, or direct/indirect applications in other related technical fields are included in the scope of the present application.

What is claimed is:

1. A dust-sticking optical filtering module, comprising:

a base, wherein a light-transmitting space is formed inside the base, and the base is provided with a first light-transmitting hole communicated with the light-transmitting space;

a light filtering assembly slidably provided in the light-transmitting space, wherein the light filtering assembly is provided with a light filtering hole corresponding to the first light-transmitting hole; and a dust-sticking plate connected to a bottom of the base to stick dust accumulated in the light-transmitting space, wherein the dust-sticking plate is provided with a second light-transmitting hole communicated with the light-transmitting space;

wherein the light filtering assembly comprises an upper base plate, a lower base plate and a light filtering piece, the upper base plate and the lower base plate are enclosed to form an accommodating chamber, the light filtering piece is provided in the accommodating chamber, and the light filtering hole is provided on the upper base plate, the lower base plate and the light filtering piece;

the upper base plate is snapped with the lower base plate; and the upper base plate is provided with a first end and a second end opposite to the first end, the second end of the upper base plate is provided with the light filtering hole, the second end of the upper base plate is slidingly connected to the light-transmitting space, and a thickness of the second end is thinner than a thickness of the first end.

2. The dust-sticking optical filtering module of claim 1, wherein an outer surface of the dust-sticking plate towards the light-transmitting space is coated with a dust-sticking film.

3. The dust-sticking optical filtering module of claim 1, further comprising:

a positioning assembly configured for connecting the base and the dust-sticking plate to fix the base and the dust-sticking plate.

4. The dust-sticking optical filtering module of claim 3, wherein the positioning assembly comprises a first positioning hole provided on the base and a second positioning hole provided on the dust-sticking plate, and the first positioning hole is fixed with the second positioning hole through a fastener.

5. The dust-sticking optical filtering module of claim 3, further comprising:

a limiting assembly configured for connecting the base and the dust-sticking plate to limit a relative position of the base and the dust-sticking plate.

6. The dust-sticking optical filtering module of claim 5, wherein the limiting assembly comprises a limiting protrusion provided at the base and a limiting hole provided at the dust-sticking plate, and the limiting protrusion is cooperated with the limiting hole to assist the positioning assembly in fixing the base and the dust-sticking plate.

7. The dust-sticking optical filtering module of claim 1, further comprising:

a thermally conductive plate embedded in an opening, wherein the thermally conductive plate is provided with a third light-transmitting hole communicated with the light-transmitting space, and a material of the thermally conductive plate is thermally conductive silica gel.

8. The dust-sticking optical filtering module of claim 7, wherein the thermally conductive plate is snapped at the opening.

9. The dust-sticking optical filtering module of claim 7, wherein an outer surface of the thermally conductive plate towards the light-transmitting space is coated with a dust-sticking film.

10. The dust-sticking optical filtering module of claim 1, wherein the base is provided with a sliding port communicated with the light-transmitting space, there are two sliding ports opposite to each other, and two ends of the light filtering assembly are respectively lapped on the two sliding ports so that the light filtering assembly is configured to slide in the light-transmitting space.

11. The dust-sticking optical filtering module of claim 1, wherein the base is further provided with an installation cavity, and the installation cavity is provided on one side of the base away from the dust-sticking plate and is communicated with the first light-transmitting hole to install a camera lens.

12. A shooting device, comprising a camera lens and the dust-sticking optical filtering module of claim 1, wherein the base is configured to carry the camera lens.

* * * * *